(12) United States Patent
Smith et al.

(10) Patent No.: US 10,069,940 B2
(45) Date of Patent: Sep. 4, 2018

(54) DEPLOYMENT META-DATA BASED APPLICABILITY TARGETTING

(71) Applicant: Microsoft Technology Licensing, LLC, Redmond, WA (US)

(72) Inventors: Phillip E. Smith, Sammamish, WA (US); William L. Cheng, Redmond, WA (US); Jason Salameh, Bothell, WA (US); Andres C. Petralli, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 14/850,871

(22) Filed: Sep. 10, 2015

(65) Prior Publication Data

US 2017/0078377 A1    Mar. 16, 2017

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/06* (2013.01); *H04L 67/34* (2013.01)

(58) Field of Classification Search
USPC ...................... 709/203, 204; 726/1; 707/783
See application file for complete search history.

(56) References Cited

U.S. PATENT DOCUMENTS

| | | |
|---|---|---|
| 5,579,509 A | 11/1996 | Furtney et al. |
| 5,758,154 A | 5/1998 | Qureshi |
| 5,890,175 A | 3/1999 | Wong et al. |
| 6,012,053 A | 1/2000 | Pant et al. |
| 6,167,441 A | 12/2000 | Himmel |
| 6,178,511 B1 | 1/2001 | Cohen et al. |
| 6,182,086 B1 * | 1/2001 | Lomet ................. G06F 11/1471 |
| 6,347,398 B1 | 2/2002 | Parthasarathy et al. |
| 6,374,102 B1 | 4/2002 | Brachman et al. |
| 6,453,361 B1 | 9/2002 | Morris |
| 6,523,166 B1 | 2/2003 | Mishra et al. |
| 6,615,191 B1 | 9/2003 | Seeley |
| 6,754,470 B2 | 6/2004 | Hendrickson et al. |
| 7,016,919 B2 | 3/2006 | Cotton et al. |
| 7,100,195 B1 | 8/2006 | Underwood |
| 7,158,943 B2 | 1/2007 | van der Riet |
| 7,158,966 B2 | 1/2007 | Brill et al. |

(Continued)

OTHER PUBLICATIONS

Office Action for U.S. Appl. No. 14/850,897, dated Feb. 10, 2017, Smith et al., "De-duplication of per-user registration data", 15 pages.

(Continued)

*Primary Examiner* — Tammy Nguyen
(74) *Attorney, Agent, or Firm* — Arent Fox LLP

(57) ABSTRACT

For applications that are designed to operate across multiple computer environments, an application distribution service may store multiple different versions of application packages, the different versions being applicable to different computing environments. Application targeted metadata associated with the application packages may be utilized to quickly diagnose the applicability of the application packages to a client device with low bandwidth cost, and before any package distribution is commenced.

18 Claims, 5 Drawing Sheets

(56) References Cited

U.S. PATENT DOCUMENTS

| | | | |
|---|---|---|---|
| 7,240,055 B2 | 7/2007 | Grasso et al. | |
| 7,257,583 B2 | 8/2007 | Hofmeister et al. | |
| 7,490,045 B1 | 2/2009 | Flores et al. | |
| 7,537,158 B1 | 5/2009 | Cox et al. | |
| 7,548,949 B2 | 6/2009 | Anderson | |
| 7,599,901 B2 | 10/2009 | Mital et al. | |
| 7,599,918 B2 | 10/2009 | Shen et al. | |
| 7,698,327 B2 | 4/2010 | Kapur | |
| 7,716,225 B1 | 5/2010 | Dean et al. | |
| 7,739,690 B2 | 6/2010 | Sedukhin et al. | |
| 7,779,064 B2 | 8/2010 | Phillips | |
| 7,783,729 B1 | 8/2010 | MacAluso | |
| 8,260,736 B1 | 9/2012 | Lear et al. | |
| 8,478,812 B2 | 7/2013 | Oliver et al. | |
| 8,635,204 B1 | 1/2014 | Xie et al. | |
| 8,650,543 B1 | 2/2014 | Winch | |
| 8,713,560 B2 | 4/2014 | Neumann et al. | |
| 8,930,939 B2 | 1/2015 | Kline et al. | |
| 9,239,762 B1 | 1/2016 | Gunda et al. | |
| 9,344,433 B2 | 5/2016 | Adams et al. | |
| 9,392,393 B2* | 7/2016 | Wood | H04W 4/001 |
| 9,788,143 B2* | 10/2017 | Kato | H04W 4/008 |
| 9,854,205 B2* | 12/2017 | Kato | H04N 7/147 |
| 9,858,437 B2* | 1/2018 | Patil | G06F 21/6245 |
| 2001/0047363 A1 | 11/2001 | Peng | |
| 2003/0191737 A1 | 10/2003 | Steele et al. | |
| 2004/0034853 A1 | 2/2004 | Gibbons et al. | |
| 2004/0043763 A1 | 3/2004 | Minear et al. | |
| 2004/0122896 A1* | 6/2004 | Gourraud | H04L 29/06 709/204 |
| 2005/0070259 A1 | 3/2005 | Kloba et al. | |
| 2005/0080780 A1 | 4/2005 | Colledge et al. | |
| 2005/0102215 A1 | 5/2005 | Ausubel et al. | |
| 2005/0120113 A1 | 6/2005 | Bunch et al. | |
| 2005/0191737 A1 | 9/2005 | Iwamoto et al. | |
| 2006/0036510 A1 | 2/2006 | Westphal et al. | |
| 2006/0067244 A1 | 3/2006 | Sekaran et al. | |
| 2006/0136389 A1 | 6/2006 | Cover et al. | |
| 2006/0155672 A1 | 7/2006 | Lee et al. | |
| 2006/0161520 A1 | 7/2006 | Brewer et al. | |
| 2006/0242138 A1 | 10/2006 | Brill et al. | |
| 2006/0259964 A1 | 11/2006 | Maldonado et al. | |
| 2007/0028266 A1 | 2/2007 | Trajkovic et al. | |
| 2007/0061242 A1 | 3/2007 | Ramer et al. | |
| 2007/0073717 A1 | 3/2007 | Ramer et al. | |
| 2007/0088603 A1 | 4/2007 | Jouppi et al. | |
| 2007/0112948 A1 | 5/2007 | Uhlik | |
| 2007/0179863 A1 | 8/2007 | Stoll | |
| 2007/0239682 A1 | 10/2007 | Arellanes et al. | |
| 2007/0266305 A1 | 11/2007 | Cong et al. | |
| 2007/0294240 A1 | 12/2007 | Steele et al. | |
| 2008/0065630 A1 | 3/2008 | Luo et al. | |
| 2008/0207182 A1 | 8/2008 | Maharajh et al. | |
| 2008/0228503 A1 | 9/2008 | Buchheit | |
| 2008/0235179 A1 | 9/2008 | Kurien et al. | |
| 2008/0270561 A1 | 10/2008 | Tang et al. | |
| 2008/0307047 A1 | 12/2008 | Jowett et al. | |
| 2009/0064055 A1 | 3/2009 | Chaudhri et al. | |
| 2009/0171721 A1 | 7/2009 | LeBaron et al. | |
| 2009/0216609 A1 | 8/2009 | Westphal | |
| 2009/0222842 A1 | 9/2009 | Narayanan et al. | |
| 2009/0228439 A1 | 9/2009 | Manolescu et al. | |
| 2009/0240586 A1 | 9/2009 | Ramer et al. | |
| 2009/0247078 A1 | 10/2009 | Sklovsky et al. | |
| 2010/0003923 A1 | 1/2010 | McKerlich et al. | |
| 2010/0010994 A1 | 1/2010 | Wittig et al. | |
| 2010/0017392 A1 | 1/2010 | Dian | |
| 2010/0100839 A1 | 4/2010 | Tseng et al. | |
| 2010/0124911 A1 | 5/2010 | Leeder | |
| 2010/0145978 A1 | 6/2010 | Anashkin et al. | |
| 2010/0233996 A1 | 9/2010 | Herz et al. | |
| 2010/0273450 A1* | 10/2010 | Papineau | G06F 8/60 455/411 |
| 2010/0306191 A1 | 12/2010 | LeBeau et al. | |
| 2011/0047594 A1 | 2/2011 | Mahaffey et al. | |
| 2011/0119287 A1 | 5/2011 | Chen et al. | |
| 2011/0161912 A1 | 6/2011 | Eteminan et al. | |
| 2011/0209143 A1 | 8/2011 | Ierullo | |
| 2011/0258301 A1 | 10/2011 | McCormick et al. | |
| 2011/0276598 A1 | 11/2011 | Kozempel | |
| 2011/0289015 A1 | 11/2011 | Mei et al. | |
| 2011/0314004 A1 | 12/2011 | Mehta | |
| 2012/0053829 A1 | 3/2012 | Agarwal et al. | |
| 2012/0054167 A1 | 3/2012 | Chi et al. | |
| 2012/0240236 A1 | 9/2012 | Wyatt et al. | |
| 2012/0284256 A1 | 11/2012 | Mahajan et al. | |
| 2013/0019237 A1* | 1/2013 | Pardehpoosh | G06Q 30/0609 717/171 |
| 2013/0111544 A1* | 5/2013 | Balinsky | G06F 21/6218 726/1 |
| 2013/0124567 A1* | 5/2013 | Balinsky | G06F 17/30011 707/783 |
| 2013/0275553 A1* | 10/2013 | Shilo | G06F 8/61 709/217 |
| 2014/0007057 A1 | 1/2014 | Gill | |
| 2014/0114901 A1 | 4/2014 | Pradhan et al. | |
| 2014/0123157 A1* | 5/2014 | Keskitalo | G06Q 10/107 719/328 |
| 2014/0149399 A1 | 5/2014 | Kurzion | |
| 2014/0250098 A1 | 9/2014 | Kasterstein et al. | |
| 2014/0337611 A1* | 11/2014 | Kuscher | G06F 9/4401 713/100 |
| 2015/0046915 A1* | 2/2015 | Oliver | G06F 8/65 717/170 |
| 2015/0304440 A1* | 10/2015 | Zheng | H04W 4/001 717/177 |
| 2016/0021115 A1 | 1/2016 | Adams et al. | |
| 2016/0042748 A1* | 2/2016 | Jain | G10L 25/48 704/9 |
| 2016/0110747 A1* | 4/2016 | Nakai | G06Q 30/0207 705/14.12 |
| 2016/0112470 A1 | 4/2016 | Pai et al. | |
| 2016/0261537 A1 | 9/2016 | Yang et al. | |
| 2016/0294571 A1* | 10/2016 | Kato | H04L 12/1818 |
| 2016/0295162 A1* | 10/2016 | Kato | H04N 7/147 |
| 2016/0295354 A1* | 10/2016 | Kato | H04L 65/4015 |
| 2016/0295626 A1* | 10/2016 | Kato | H04L 12/1818 |
| 2016/0314316 A1* | 10/2016 | Patil | G06F 21/60 |
| 2016/0366371 A1* | 12/2016 | Kato | H04L 67/303 |
| 2017/0076075 A1 | 3/2017 | Smith et al. | |
| 2017/0078377 A1* | 3/2017 | Smith | H04L 67/06 |
| 2018/0048861 A1* | 2/2018 | Kato | H04L 65/4015 |

OTHER PUBLICATIONS

Office action for U.S. Appl. No. 12/945,061, dated Mar. 24, 2017, Macbeth et al., "Rich Search Over and Deep Integration with Applications", 20 pages.

Office action for U.S. Appl. No. 12/945,207, dated Dec. 7, 2016, Macbeth et al., "Application Transfer Protocol", 28 pages.

Office action for U.S. Appl. No. 12/944,899, dated Apr. 12, 2017, Steven Charles Tullis, "Unified Application Discovery across Application Stores", 26 Pages.

Office action for U.S. Appl. No. 12/945,207, dated May 12, 2017, Macbeth et al., "Application Transfer Protocol", 28 pages.

Office action for U.S. Appl. No. 12/960,267, dated May 3, 2017, Zargahi et al., "Using Behavioral Data to Manage Computer Services", 32 pages.

Office action for U.S. Appl. No. 12/960,327, dated Jan. 22, 2016, Bruno Jr. et al., "Meta-Application Framework", 12 pages.

Office action for U.S. Appl. No. 12/945,207, dated Dec. 3, 2015, Macbeth et al., "Application Transfer Protocol", 25 pages.

Office action for U.S. Appl. No. 12/944,899, dated Dec. 4, 2015, Tullis et al., "Unified Application Discovery across Application Stores", 23 pages.

Office action for U.S. Appl. No. 12/945,061, dated Sep. 28, 2016, Macbeth et al., "Rich Search Over and Deep Integration with Applications", 23 pages.

Office action for U.S. Appl. No. 12/945,207, dated May 2, 2016, MacBeth et al., "Application Transfer Protocol", 29 pages.

(56) References Cited

OTHER PUBLICATIONS

Office action for U.S. Appl. No. 12/960,267, dated Jun. 17, 2016, Zargahi et al., "Using Behavioral Data to Manage Computer Services", 30 pages.
Office Action for U.S. Appl. No. 12/944,899, dated Jul. 22, 2016, Steven Charles Tullis et al., "Unified Application Discovery across Application Stores", 27 pages.
Aktas et al., "XML Metadata Services," retrieved on Jul. 12, 2010 at <<http://citeseerx.ist.psu.edu/viewdoc/download? doi=10.1.1.69.2190&rep=rep1&type=pdf>>, Proceedings of International Conference on Semantics, Knowledge and Grid (SKG), Guilin, CN, Nov. 2006, pp. 1-24.
"Application Compatibility Analyzer 1.0," Microsoft.com, retrieved on Jul. 2, 2015, available at <<https://www.microsoft.com/en-us/download/details.aspx?id=20398>>, 3 pages.
Bartz et al., "Finding Similar Failures Using Callstack Similarity," USENIX Association, In the Proceedings of the Third Conference on Tackling Computer Systems Problems With Machine Learning Techniques, 2008, pp. 1-13.
Bode, "Apple Hits Users With Behavioral Ads: Changes privacy policy, offers new opt-out option," retrieved on Aug. 11, 2010 at <<http://www.dslreports.com/shownews/Apple-Hits-Users-With-Behavioral-Ads-109005>> dslreports.com, Broadband, Jun. 22 2010, pp. 1-15.
Cheng, "Google's new behavioral ads already raising privacy worries," retrieved on Aug. 11, 2010 at <<http://arstechnica.com/web/news/2009/03/googles-interest-based-ads-try-to-address-privacy-worries.ars>>, Conde Nast Digital, Ars Technica, Mar. 11, 2009, pp. 1-2.
Citrix.com, "Exploring Application compatibility methods," White Paper, available at <<https://www.citrix.com/content/dam/citrix/en_us/documents/products-solutions/exploring-application-compatibility-methods.pdf>>, 2012, 11 pages.
Constantinou, "Mobile App Stores: The Next Two Years," retrieved on Jul. 16, 2010 at <<http://www.visionmobile.com/blog/2009/10/mobile-app-stores-the-next-two-years/>>, Visionmobile, Oct. 3-0, 2009, pp. 1-15.
Edwards, "Carriers missing opportunity with app stores," retrieved on Jul. 6, 2010 at <<http://www.mobilecommercedaily.com/carriers-missing-opportunity-with-app-stores/>>, Mobile Commerce Daily, Jun. 14, 2010, pp. 1-3.
Essany, "Google Puts App Store Links in Mobile Search Results," retrieved on Jul. 16, 2010 at <<http://www.mobilemarketingwatch.com/google-puts-app-store-links-in-mobile-search-results-7190/>>, Mobile Marketing Watch, Juen 3, 2010, pp. 1-7.
Freeman, "Information is Everywhere Managing Information for Discovery and Search," retrieved on Jul. 15, 2010 at <<http://www.dexmar.com/website/dexcom4.nsf/c2f7f2b8d369f55b8025684d00603bab/9cb30babeb66fd4b802571650025d96e/$FILE/IBM%20Search%20and%20Discovery.ppt>>, IBM Software Group, May 2006, pp. 1-46.
Garimella, "Understanding the Application Compatibility in Your Environment," retrieved on Jun. 29, 2015, available at <<https://technet.microsoft.com/en-us/library/ee449434(v=ws.10).aspx>>, Feb. 20, 2011, 3 pages.
Grove, "Read or Update a Registry Key for All Users on a System," Mick's Mix, Jan. 13, 2012, 3 pages.
IBM.com, "Using the Lotus Notes Single User to Multi-User Migration Assistant (MUMA) Tool," retrieved on Jul. 3, 2015, available at <<http://www-01.ibm.com/support/docview.wss?uid=swg21459627>>, Oct. 4, 2011, 5 pages.
Kats, "Ace Marketing, Blue Bite to launch proximity marketing network—news briefs," retrieved on Jul. 6, 2010 at <<http://www.mobilecommercedaily.com/today-in-mobile-commerce-news-briefs-2/>>, Mobile Commerce Daily, Apr. 2, 2010, pp. 1-2.
Khnaser, "Cool, Free Virtualization Tool: Microsoft's RDS Application Compatibility Analyzer," available at: <<https://virtualizationreview.com/blogs/virtual-insider/2011/05/free-microsoft-rds-application-compatibility-analyzer.aspx>>, May 31, 2011, 4 pages.
Liang, "Inventory software with Microsoft's Application Compatibility Analyzer," available at <<http://www.techrepublic.com/article/inventory-software-with-microsofts-application-compatibility-analyzer/>>, Jun. 30, 2003, 14 pages.
Linthicum, "Mercator / Next Generation Application Integration, From Information, to Process, to Services," retrieved on Jul. 12, 2010 at <<http://bukovec.fei.tuke.sk/predmety/pdt/referaty/EnterpriseApplicationIntegration/Steller/zad1/wp_next_gen_app_integration.pdf>>, Mercator Software, Wilton, CT, Oct. 2001, pp. 1-18.
Madden, "How Applications use the Registry in Terminal Server Environments," retrieved on Jul. 3, 2015, available at <<http://www.brianmadden.com/blogs/brianmadden/archive/2004/08/03/how-applications-use-the-registry-in-terminal-server-environments-part-2-of-3.aspx>>, Aug. 3, 2015, 8 pages.
Marl, "User Data and Settings Management," retrieved on Jul. 3, 2015, available at <<https://technet.microsoft.com/en-us/library/bb490855.aspx>>, Aug. 1, 2001, 22 pages.
Microsoft.com, "Managing Default Applications," retrieved on Jul. 3, 2015, available at <<https://msdn.microsoft.com/en-us/library/windows/desktop/cc144160(v=vs.85).aspx>>, Mar. 25, 2013, 6 pages.
Microsoft.com, "Registry Hives," retrieved on Jul. 3, 2015, available at <<https://msdn.microsoft.com/en-us/library/windows/desktop/ms724877(v=v.85).aspx>>, Oct. 2, 2011, 2 pages.
Microsoft.com, "Run and RunOnce Registry Keys," retrieved on Jul. 3, 2015, available at <<https://msdn.microsoft.com/en-us/library/aa376977(v=vs.85).aspx>>, Jun. 29, 2015, 2 pages.
Microsoft.com, "Windows Registry Information for Advanced Users," retrieved on Jul. 3, 2015, available at <<https://support.microsoft.com/en-us/kb/256986>>, May 12, 2015, 13 pages.
Miyamura, "What Drives iTunes App Store Search Rankings?" retrieved on Jul. 16, 2010 at <<http://www.appsasabiz.com/2010/02/03/what-drives-itunes-app-store-search-rankings/>>, apps as a biz, Feb. 3, 2010, pp. 1-6.
Mondok, "Microsoft behavioral advertising technology goes global," retrieved on Aug. 11, 2010 at <<http://arstechnica.com/microsoft/news/2006/12/6414.ars>>, Conde Nast Digital, Ars Technica, Dec. 28, 2006, 1 page.
O'Connor et al., "PolyLens: A Recommender System for Groups of Users," retrieved on Aug. 11, 2010 at <<http://www.grouplens.org/papers/pdf/poly-camera-final.pdf>>, Kluwer Academic Publishers, Proceedings of European Conference on Computer Supported Cooperative Work (ECSCW), 2001, pp. 199-218.
Office action for U.S. Appl. No. 12/960,263, dated Jan. 31, 2013, Bruno Jr. et al., "Improving Discoverability Using Behavioral Data," 17 pages.
Office action for U.S. Appl. No. 12/960,267, dated Jan. 31, 2013, Zargahi et al., "Using Behavioral Data to Manage Computer Services," 18 pages.
Office action for U.S. Appl. No. 12/944,899, dated Oct. 23, 2014, Steven Charles Tullis, "Unified Application Discovery across Application Stores," 25 pages.
Office action for U.S. Appl. No. 12/945,061, dated Nov. 23, 2012, Macbeth et al., "Rich Search Over and Deep Integration with Applications," 25 pages.
Office action for U.S. Appl. No. 12/945,207, dated Dec. 12, 2012, Macbeth et al., "Application Transfer Protocol," 19 pages.
Office action for U.S. Appl. No. 12/945,061, dated Dec. 12, 2014, Macbeth et al., "Rich Search Over and Deep Integration with Applications," 17 pages.
Office action for U.S. Appl. No. 12/944,899, dated Dec. 13, 2012, Tullis et al., "Unified Application Discovery across Application Stores," 24 pages.
Office action for U.S. Appl. No. 12/945,207, dated Feb. 12, 2015, Macbeth et al., "Application Transfer Protocol," 26 pages.
Non-Final Office Action for U.S. Appl. No. 12/944,899, dated Mar. 15, 2012, Steven Charles Tullis et al., "Unified Application Discovery across Application Stores," 23 pages.

(56) References Cited

OTHER PUBLICATIONS

Office Action for U.S. Appl. No. 12/960,327, dated Mar. 16, 2012, John Bruno, "Meta-Application Framework," 14 pages.
Office action for U.S. Appl. No. 12/960,267, dated Apr. 17, 2015, Zargahi et al., "Using Behavioral Data to Manage Computer Services," 25 pages.
Office action for U.S. Appl. No. 12/960,327, dated Apr. 7, 2014, Bruno Jr. et al., "Meta-Application Framework," 23 pages.
Office action for U.S. Appl. No. 12/945,061, dated May 10, 2012, Macbeth et al.,"Rich Search Over and Deep Integration with Applications," 19 pages.
Office action for U.S. Appl. No. 12/945,061, dated May 20, 2014, Macbeth et al., "Rich Search Over and Deep Integration with Applications," 14 pages.
Office action for U.S. Appl. No. 12/944,899, dated May 21, 2015, Tullis et al., "Unified Application Discovery across Application Stores," 20 pages.
Office action for U.S. Appl. No. 12/960,263, dated Jun. 11, 2013, Bruno Jr. et al., "Improving Discoverability Using Behavioral Data," 20 pages.
Office action for U.S. Appl. No. 12/960,267, dated Jun. 11, 2013, Zargahi et al., "Using Behavioral Data to Manage Computer Services," 23 pages.
Office action for U.S. Appl. No. 12/945,207, dated Jun. 26, 2012, Macbeth et al., "Application Transfer Protocol," 18 pages.
Final Office Action for U.S. Appl. No. 12/944,899, dated Jul. 9, 2013, Steven Charles Tullis et al., "Unified Application Discovery across Application Stores," 26 pages.
Office action for U.S. Appl. No. 12/945,207, dated Aug. 12, 2014, Macbeth et al., "Application Transfer Protocol," 22 pages.
Final Office Action for U.S. Appl. No. 12/960,327, dated Aug. 14, 2014, John Bruno, "Meta-Application Framework," 26 pages.
Office action for U.S. Appl. No. 12/960,327, dated Sep. 12, 2012, Bruno Jr. et al., "Meta-Application Framework," 22 pages.
Office Action for U.S. Appl. No. 12/960,267, dated Sep. 18, 2014, Kamran Rajabi Zargahi, "Using Behavioral Data to Manage Computer Services," 21 pages.
Office action for U.S. Appl. No. 12/960,263, dated Sep. 9, 2014, Bruno Jr. et al., "Improving Discoverability Using Behavioral Data," 21 pages.
Office action for U.S. Appl. No. 12/945,061 dated Sep. 9, 2015, Rucker et al., "Rich Search Over and Deep Integration with Applications," 17 pages.
"Openwave Mobile Analytics suggests new revenue opportunities for operators," retrieved on Jul. 6, 2010 at <<http://www.telecoms.com/18260/openwave-mobile-analytics-suggests-new-revenue-opportunities-for-operators/>>, Telecoms.com, Mobile World Congress, Barcelona, Feb. 16, 2010, pp. 1-6.
Perez, "Mobile Cloud Computing: 9.5 Billion by 2014," retrieved on Jul. 6, 2010 at <<http://www.readwriteweb.com/archives/mobile_cloud_computing_95_billion_by_2014.php>>, ReadWriteWeb, Feb. 23, 2010, pp. 1-4.
U.S. Appl. No. 12/960,263, filed Dec. 3, 2010, Bruno et al., "Improving Discoverability Using Behavioral Data," 45 pages.
U.S. Appl. No. 12/960,267, filed Dec. 3, 2010, Zargahi et al., "Using Behavioral Data to Manage Computer Services," 64 pages.
U.S. Appl. No. 12/960,327, filed Dec. 3, 2010, Bruno et al., "Meta-Application Framework," 42 pages.
Sims, "How to Detect RDS-Specific Application Compatibility Issues by Using the RDS Application Compatibility Analyzer," available at <<http://2x.helpserve.com/knowledgebase/article/View/84/0/how-to-detect-rds-specific-application-compatibility-issues-by-using-the-rds-application-compatibility-analyzer>>, Feb. 12, 2010, 2 pages.
"The Windows NT Registry Database," retrieved on Jul. 3, 2015, available at <<http://scilnet.fortlewis.edu/tech/NT-Server/registry.htm>>, Mar. 7, 2001, 4 pages.
Vax, "Inside the App Store: The New Marketplace for Digital Goods," retrieved on Jul. 6, 2010 at <<http://www.getelastic.com/app-stores/>>, Elastic Path, Mar. 4, 2010, pp. 1-7.
Webster, "Amazon Throws Hat Into Android App Store Ring," retrieved on Oct. 1, 2010 at <<http://www.cnet.com/8301-19736_1-20018078-251.html>>, CNet, Sep. 29, 2010, 2 pages.
Office action for U.S. Appl. No. 12/960,327, dated Sep. 15, 2015, Bruno et al., "Meta-Application Framework", 22 pages.
Office action for U.S. Appl. No. 12/945,061, dated Feb. 2, 2016, MacBeth et al., "Rich Search Over and Deep Integration with Applications", 17 pages.
Office action for U.S. Appl. No. 12/960,267, dated Feb. 2, 2016, Zargahi et al., "Using Behavioral Data to Manage Computer Services", 27 pages.

\* cited by examiner

DEPLOYMENT META-DATA BASED APPLICABILITY TARGETTING

BACKGROUND

Software developers design applications to assist users in performing various functionalities on electronic devices. However, due to the diversity of types of devices (i.e. laptops, tablets, smartphones, gaming consoles, Kinect, etc.), hardware specifications, operating systems, architectures, and other variations, software designers must design different software packages to be compatible with respective client devices. These software packages are often distributed by a centralized entity. However, each software package may be applicable to only one or a subset of devices, device types, and/or users. Techniques applied by existing application stores to determine whether one or more application packages are applicable to a particular client device have proven to be error prone and inefficient.

SUMMARY

The Specification, Figures, and Claims enclosed herein describe techniques for utilizing targeted metadata to determine the applicability of application packages, resource packages, and/or package bundles to particular client devices. In some examples, an application distribution service stores instances of application targeted metadata that identify parameters and requirements of one or more application files corresponding to an application distributed by the application distribution service. The instances of application targeted metadata may then be compared to the parameters of a client device to determine the applicability of the one or more application files to the client device.

To allow for accurate and efficient applicability determinations the application distribution service may store metadata corresponding to the applicability parameters of the application files. For example, the metadata may identify the types of electronic devices, localizations, features, contrasts, language, hardware requirements, operating system, etc. to which one or more corresponding application files are applicable. This metadata may be compared to one or more characteristics of the client device to determine the applicability of individual application files to the client device. Then, by only downloading application files that are determined to be applicable to it, the client device saves both time, bandwidth, and on device storage space.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
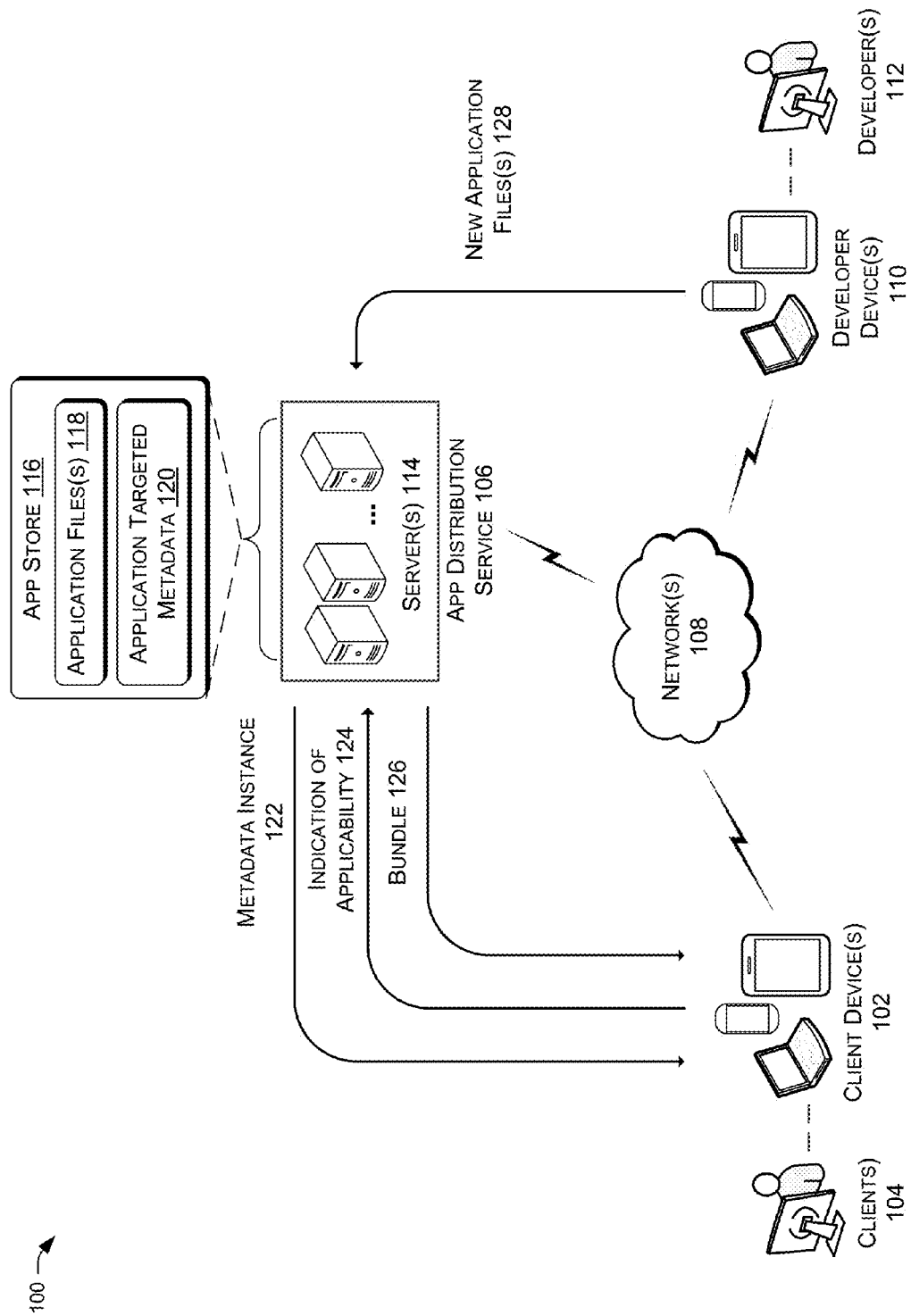
FIG. 1 is a schematic diagram of an example architecture illustrating techniques for utilizing application targeted metadata to determine the applicability of application package bundles to a particular client device.

Application distribution services store and distribute applications that are executable on a wide range of client devices. To ensure that their applications are compatible with computing devices having different hardware specifications, operating systems, architectures, etc., software designers componentize the application into multiple component application files corresponding to different application functionalities, and create different versions of individual component application files configured for different computing environments. Because of this, the application distribution service may store multiple application files corresponding to an individual application functionality, each file being applicable to a different computer environment. The application files may comprise one or more application packages and/or resource packages corresponding to an application distributed on by the application distribution service. For example, the application distribution service may store multiple resource packages corresponding to different resolution texture data for a word processing application that it distributes (i.e., high resolution texture data for display on smartphones, low resolution texture data for display on computer monitors, etc.). In another example, the application distribution service may store multiple application packages associated with a social networking application, each package comprising code configured to allow the social networking application to be executed on a particular operating system (e.g. a tablet operating system, a desktop operating system, etc.).

To save time, bandwidth, and on device storage space, it is desirable for client devices to only download application files which are applicable to them. However, the techniques applied by existing application distribution services to determine whether an application package is applicable to a particular client device have proven to be error prone and inefficient.

This application describes techniques for utilizing application targeted metadata to determine the applicability of application files, such as application packages, resource packages, etc. to a particular client device. An application distribution service (e.g. an app store, etc.) may be operated by a service provider to store and distribute applications to client devices. The applications and associated files may be developed by any of a service provider operating the application distribution service, a third-party software developer, or a combination of the two. Additionally, the application distribution service may store one or more application files, such as application packages, resource packages, etc. corresponding to an individual application. In some instances, an application distribution service might store and distribute one or more application files for an individual feature or functionality of an application, individual applications files of the one or more application files being configured to be applicable to different computer environments (e.g., a first language resource package for German, a second language resource package for Japanese, etc.).

The application distribution service may store application targeted metadata associated with the application files. Instances of the application targeted metadata may store information containing applicability information to deploy that package (i.e., types of electronic devices, localizations, contrasts, language, hardware requirements, an operating system, etc. to which the application file is applicable). For example, an instance of application targeted metadata may identify that a first package for Microsoft Word is applicable to tablet devices running Windows Vista®. Meanwhile, another instance of application targeted metadata may identify that a second package for Microsoft Word is applicable to tablet device running iOS version 9. The metadata may include any data structure or format capable of preserving and conveying such information. For example, the application targeted metadata may be preserved and conveyed in a text file (e.g., JavaScript object notation (JSON) file, etc.).

In some examples, the application targeted metadata may be generated or obtained when the software developer onboards a new application package to the application distribution service. The new application package may correspond to a new application for distribution, or it may correspond to an update for an existing application on the application distribution service. For example, to update an application so that it can now target an additional device or family of devices, an application developer may provide new application packages and/or package components configured to be executed on the additional device or family of devices. The application targeted metadata can be derived from information provided by the developer associated with the new application package, data extracted automatically from the new application package, or a combination of both.

The application targeted metadata can be used to determine the applicability of one or more application packages to a client device. In some examples, this determination may be made based at least in part upon a comparison between the targeted application metadata and one or more characteristics of a client device. Previous techniques applied by existing application distribution services to determine whether an application package is applicable to a particular client device involved initiating the downloading of the one or more packages before the determination could be made. This resulted in "ghost" updates, where updates were initiated for the client device, but because no new packages were applicable to the client device, no application files were actually installed. This is both inefficient, and it creates a frustrating user experience. In some examples, these "ghost" updates can be avoided by executing the metadata comparison to identify whether applicable application files are present before an update is initiated. By only downloading application files that are determined to be applicable to it, the client device saves both time and bandwidth.

The comparison may occur when an application package is to be installed on the client device. In some examples, the comparison may be initiated by a notification sent by a client device to install an application on the client device. Alternatively, a notification may be pushed from the application distribution service that an application is to be installed (or is available to be installed) on the client device.

In some cases, the notification may include an application identifier (ID) corresponding to the application that is to be installed on the client device. The application distribution service may utilize the application ID to identify a corresponding application, and one or more application files stored on the distribution server that have been associated with the application. For example, after receiving a notification including the application ID "MS Word," the distribution server may identify application files stored on the server that are associated with the application Microsoft Word, such as application packages coded for one or more different computing environments.

The application distribution service may rank the one or more associated application files, and select one or more of the application files based in part on the ranking Additionally or alternatively, the application distribution service may select one or more of the application files based at least in part on one or more other means, such as parameters of the client device, history associated with the client device, popularity of individual application files, etc. For example, if the notification is regarding an update for an application already installed on the client device, the application distribution service may select the application file from a subset of files that have been added since the last time the client device acquired an update. In this way, the application distribution service may only select application files which have not previously been downloaded or been determined to be not applicable. Previous techniques applied by existing application distribution services to determine whether an application package is applicable to a particular client device involved applicability checks performed by multiple components of a computing system. However, because the techniques discussed herein allow for the applicability check to be performed by a single component, such redundant comparisons do not need to be made. Additionally, by having a single component perform the comparison, more consistent and accurate results can be achieved.

The application distribution service may then identify an instance of application targeted metadata that has been associated with the selected one or more application files, and store information containing applicability information to deploy the selected one or more application files. This instance of application metadata may then be compared to one or more characteristics of the client device to determine the applicability of the selected one or more application files to the client device. By only comparing the instances of metadata corresponding to the selected packages, time and bandwidth are saved, as only a small amount of metadata associated with the application needs to be transmitted and/or read.

This comparison may be made on the client device, on the application distribution service, or by a third party service. For example, in some examples the application distribution service may send the instance of application targeted metadata to the client device via a communication interface. The client device may then compare this instance of metadata to the one or more characteristics of the client device to determine whether the application file is applicable to the client device. This applicability determination may be performed, in whole or in part, by a system service, agent, deployment engine, or an application executed on the computing device (e.g. a local app store application). For example, a deployment engine executing on the client device may read an instance of metadata describing that an application package comprises coding for a gaming application, and is configured to be executed on an x86 processor. The deployment engine can then compares this metadata to the processor characteristics of the client device to determine if the application file is applicable to the client device, and provide an indication of the applicability of the application package.

In some examples, the application distribution service may receive from a developer device a new application file associated with an application to be distributed by the application distribution service. For example, the new application file may be a Japanese language resource package for a new application to be stored and distributed by the application distribution service. Alternatively, the new application file may be an update providing new functionality/applicability to an application currently stored and distributed by the application distribution service. The application distribution service may then generate metadata for the new application file based on at least one of information provided by the developer device, or information extracted from the new application file.

As used herein, "applicability" may correspond to a suitability of a software application file for a particular type of device (i.e. laptops, tablets, smartphones, gaming consoles, etc.), hardware specification, operating systems, architectures, etc. Additionally, "applicability" may correspond to the suitability of a software application file for download on the client device. For example, in some instances, the applicability of an application package may depend upon one or more of whether the application package is already installed on the client device; whether a user, application, system, server, or third party has indicated that the application package is not desired; whether an application developer, distribution server, or other third party has indicated that the application package is not to be downloaded; etc. For example, the developer of an application package may have expressed applicability only to install the application package on an internal disk drive of a client device. Thus, even though the application package may otherwise applicable to be downloaded and executed on an external disk drive, the client device would determine that, in that case, the application package is not "applicable." "Applicability" may also depend on user preferences and/or settings, such as language support, permissions, subscriptions, etc. For example, an update corresponding to new application files configured to provide Japanese language support may not be applicable if the user has turn off Japanese language support on the client device. In another example, an update corresponding to new application files configured to provide location related services for an application may not be applicable if a user has not granted the application permission to track location.

The techniques described herein may be implemented in whole or in part by one or more servers associated with an application distribution service. In some examples, certain techniques (or portions thereof) may be implemented at a client device associated with a client and/or by another computing device (e.g., an intermediary web service). By way of example and not limitation, illustrative systems and devices suitable for implementing the techniques are described below with reference to the figures.

Example Architecture

FIG. 1 is a schematic diagram of an example architecture 100 that introduces techniques for utilizing application targeted metadata to determine the applicability of application packages and/or package bundles to a particular client device. Additional details of individual operations illustrated in FIG. 1 and discussed below are described in more detail with reference to subsequent figures.

The architecture 100 includes one or more client devices 102 (sometimes referred to as a "computing devices 102") which are associated with one or more clients 104. The client devices 102 may include many different types of electronic devices, including laptops, tablets, smartphones, gaming consoles, etc., as well as different makes and models of each type of electronic device. The client devices 102 are in communication with an application distribution service 106 via a network 108 such as, for example, the internet. The architecture 100 further includes one or more developer devices 110 (i.e., laptops, tablets, smartphones, gaming consoles, etc.) associated with one or more software developers 112. The application distribution service 106 may be implemented or hosted by one or more servers, server farms, data centers, cloud computing resources, or other computing devices. In the illustrated example, the application distribution service 106 is implemented by one or more servers 114.

FIG. 1 illustrates the application distribution service 106 hosting an app store 116. The app store 116 may make one or more software applications available to client devices over the network 108, which may be made available to the client devices 102. The application distribution service 106 may also store one or more application files 118 associated with the one or more applications. The application files 118 may include one or more of application packages or resource packages comprising coding (e.g., an executable binary file) to provide one or more application feature when executed in a computer environment. Features for the application may include, for example, resolution texture data, language data, multimedia application program interface (API) version, region related data, screen orientation, screen aspect ratio, input method (i.e., keyboard layout, touch, mouse, etc.), data for high contrast inverted-color modes, non-multimedia API versions, mobile network type/provider, etc.

Furthermore, the coding of individual application files 118 may be configured to execute on a particular computing environment, such as a particular type of electronic device, localization, features, contrasts, language, hardware requirements, processor, graphics card, display requirements, operating system, etc. For example, a first application file may comprise coding configured to be executed on a first processor architecture, but not on a second processor architecture. As the app store 116 may provide an individual application to client devices 102 comprising a diverse array of computer environments, the application distribution service 106 may store multiple application files 118 corresponding to an individual application features for different computer environments. For example, the application distribution service 106 may store a first resource package for Microsoft Word corresponding to language data for "English," and a second resource package for Microsoft Word corresponding to language data for "German."

The application distribution service 106 may also store one or more instances of metadata 120 associated with the application files. In some examples the application packages 118 and/or the application targeted metadata 120 may be stored on a content delivery system that may be hosted on the backend of the app store 116. The application targeted metadata 120 may store information containing applicability information to deploy a corresponding application file. That is, an instance of application targeted metadata 120 may identify a particular computer environment in which the corresponding application file is configured to execute.

FIG. 1 further illustrates an example process that may be used to determine the applicability of an application file 118 to a client device 102. This process may be initiated by a notification sent by the client device 102 to install an application corresponding to the application file 118. Alternatively, a notification may be pushed from the distribution server that an application is to be installed (or is available to be installed) on the client device 102. In response to such a push, the client device 102 may send metadata identifying parameters of its computing environment to the application distribution service 106, where it can be compared to application targeted metadata associated with one or more application files.

In some cases, the notification may include an application ID corresponding to the application that is to be installed on the client device 118. The application distribution service 106 may utilize the application ID to identify one or more application packages 118 associated with the application. The application distribution service 106 may rank the one or more application files 118 based at least in part on one or more of parameters of the client device 102, history associated with the client device, popularity of individual application files, etc. For example, the application distribution service may rank the one or more application files 118 based on the date each application file was stored on the application distribution server. The application distribution service 106 may select one or more of the application packages 118 based in part on the ranking, or according to other means.

Once the process is initiated, the application distribution service 106 sends an instance of targeted application metadata 122 to the client device on which the application is to be installed. The instance of targeted application metadata 122 may be selected by the application distribution service 106 based upon its association with the selected application file. For example, the instance of metadata 122 may store information containing applicability information to deploy the selected application file 118.

The instance of targeted application metadata 122 may be used by the client device 102 to determine the applicability of the selected application file 118 to a client device. In some examples, this determination may be made based at least in part upon a comparison between the instance of targeted application metadata 122 and one or more parameters of the client device 102. FIG. 1 illustrates an example wherein this comparison is made on the client device 102. For example, if the instance of metadata 122 contains information that the corresponding application file 118 is an application package comprising coding configured to be executed on a gaming console, but the client device is a tablet device, the client device may determine that the application package is not applicable. As another example, the client device may determine that an application file is not applicable because the metadata 122 shows that the application is only intended for mature audiences, while the client 104 associated with the client device 102 is 15 years old.

In some processes, the applicability determination may be performed by a single entity on the client device 102, such as an application service or a deployment engine. By having the comparison performed by a single entity, the application distribution service 106 can ensure consistent and accurate results. Additionally, as all applicability determinations are handled by the single entity, redundant comparisons do not need to be made by different services, engines, operating systems, etc. on the client device 102.

In the process illustrated FIG. 1, the client device 102 sends an indication of applicability 124 to the application distribution service 106. The indication of applicability 124 may identify the applicability of the selected application file 118. For example, the application service may indicate that the selected application file 118 is already installed on the client device 102 and does not need to be installed, that it is installed on the client device 102 but needs to be reinstalled, that it is installable, or that the application file 118 is not applicable. Alternatively, the indication of applicability 124 may identify that the selected application file 118 is either applicable, or is not applicable to the client device 102. The application distribution service 106 may provide an application bundle 126 to the client device 102. The application bundle 126 may include an application file 118 that has been determined to be applicable to the client device 102. Additionally, the process of the applicability distribution server 106 sending instances of metadata 122 to the client device 102 and receiving indications of applicability 124 from the client device 102 may be conducted multiple times. Thus, the application package bundle 126 may include one or more application files 118 that have been determined to be applicable to the client device 102.

In the process illustrated FIG. 1, the developer device 110 sends a new application file(s) 128 associated with an application to the application distribution service 106. For example, the new application file 128 may be a Swahili language resource package for a new application to be stored and distributed by the application distribution service 106. Alternatively, the new application file 128 may be an update providing new functionality/applicability to an application currently stored and distributed by the application distribution service 106. The application distribution 106 service may then generate application targeted metadata 120 for the new application file 128 based on at least one of information provided by the developer device 110, or information extracted from the new application file 128.

Example Applicability Determination System

Figure 2:
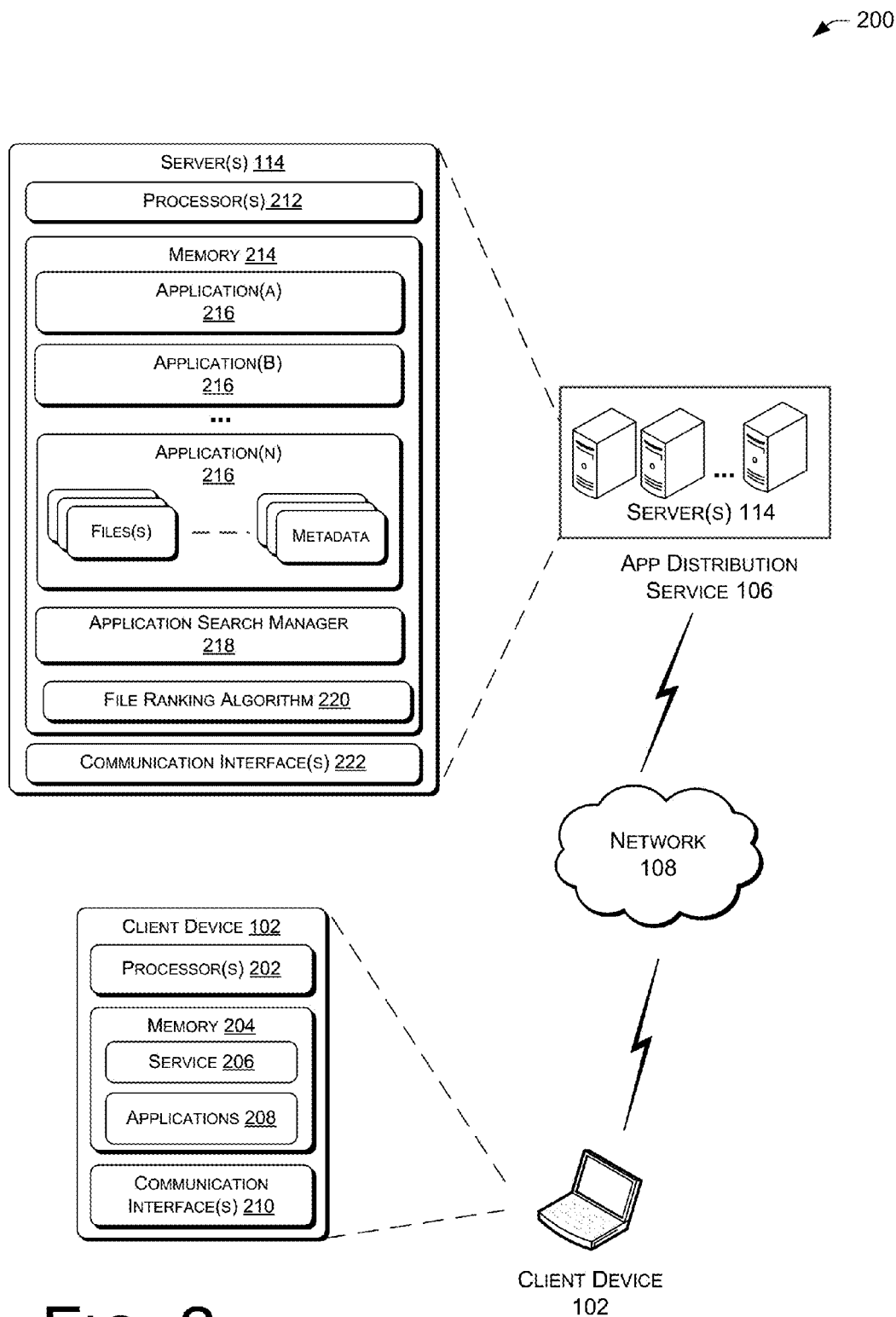
FIG. 2 is a schematic diagram illustrating an example system utilizing application targeted metadata to determine the applicability of application package bundles to a particular client device.

FIG. 2 is a schematic diagram illustrating an example system 200 utilizing application targeted metadata to determine the applicability of application files to a particular client device. FIG. 1 illustrates a generalized system and conceptual flow of operations determining the applicability of application packages using application targeted metadata, FIG. 2 illustrates additional details of hardware and software components that may be used to implement such techniques. The system 200 is merely one example, and the techniques described herein are not limited to performance using the system 200 of FIG. 2. The system 200 includes the client device 102 and the application distribution service 106.

In the example of FIG. 2, the client device 102 includes one or more processors 202 and memory 204 communicatively coupled to the processor(s) 202. The client device 102 may be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, wearable technologies (i.e. augmented reality, watches, health monitors, etc.) and so forth. FIG. 2 shows representative client device 102 in the forms of a laptop computer 102. However, this is merely an example, and the client device 102 according to this application may take other forms.

The client device 102 may include a service 206 and one or more applications 208 stored in the memory 204. The services 206 may be a part of the operating system of the client device 102, or it may be a separate application. For example, in some instances the service 206 may comprise the Windows® update client. Examples of the application(s) 208 stored in the memory 204 include a social networking application, a media player, a game, an email or messaging application, a word processing application, a shopping application, or the like.

The client device 102 may also include one or more communication interfaces 210 by which the client device 102 is able to communicate with other devices over a network 108. The client device 102 may also include one or more of a browser through which the client device 102 may interact with the application distribution service 106, or a particular application associated with the application distribution service 106, via the communication interface 210 over the network 108.

The application distribution service 106 may be implemented or hosted by one or more servers, server farms, data centers, or other computing devices. In the illustrated example, the application distribution service 106 is implemented by multiple servers 214. The application distribution service 106 includes one or more processors 212 communicatively coupled to memory 214. Memory 214 may include one or multiple memory devices. The application distribution service 106 also includes one or more communication interfaces 222 by which the application distribution service 106 is coupled to the network 108. In the illustrated example, the memory 214 stores data associated with one or more applications 216. These applications 216 may be made available via an app store associated with the application distribution service 106. The data associated with the applications 216 may include one or more application files 118 comprising coding for one or more application features configured to be executed in a particular computer environment. The data associated with the applications 216 may also include targeted application metadata for the one or more application files. The application targeted metadata 120 may store information containing applicability information to deploy that package.

Memory 214 may also include an application search manager 218, that allows the application distribution service 106 to locate application 216 information stored in the memory. For example, the application search manager may receive an application ID, and may use the application ID to locate an associated application stored in the memory. Additionally, memory 214 may include a file ranking algorithm 220 configured to rank one or more packages files associated with an application.

The processor(s) 202 and 212 may be configured to execute instructions, applications, or programs stored in the memories 204 and 214, respectively. In some examples, the processor(s) 202 and/or 212 may include hardware processors that include, without limitation, a hardware central processing unit (CPU), a graphics processing unit (GPU), a field programmable gate array (FPGA), a complex programmable logic device (CPLD), an application specific integrated circuit (ASIC), a system-on-chip (SoC), or a combination thereof.

The memories 204 and 214 are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as client device 102 or servers 114. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the communications interface(s) 210 and 222 include physical and/or logical interfaces for connecting the respective computing device(s) to another computing device or a network. For example, the communications interface(s) 210 and 222 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
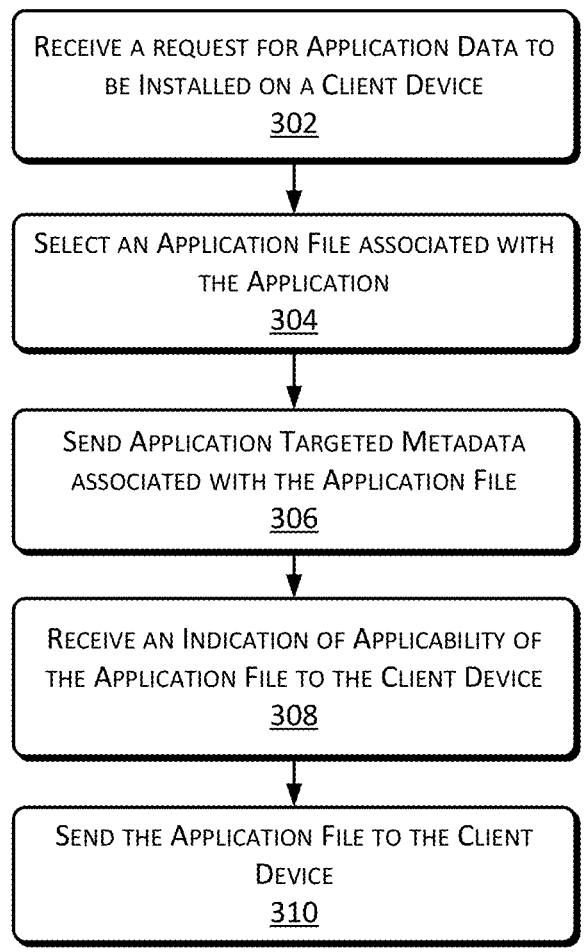
FIG. 3 is a schematic diagram illustrating an example process for determining the applicability of an application using targeted metadata associated with the application.

Example Process for Determining Application Applicability Using Application Targeted Metadata FIG. 3 is flow diagram of an example process 300 of determining the applicability of an application file using targeted metadata associated with the application. The process 300 may be performed as a backend content delivery network (i.e. the cloud) by a computing device (e.g., application distribution service 106), as a local process by a client device (e.g., client device 102), or by a combination of backend and local operations.

As shown in FIG. 3, at operation 302, the computing device (e.g., application distribution service 106) receives a request for application data associated with an application to be installed on a client device. The application data may correspond to an installation of the application onto the client device, or an update to an application currently existing on the client device. Additionally, the request may comprise a request for a list of applicable updates available from the computing device. The request may be received via a notification from the client device. In some instances the notification may include an application ID corresponding to the application that is to be installed on the client device.

At operation 304, the computing device selects an application file associated with the application. In some instances, the application distribution service 106 may utilize the application ID to identify one or more application files 118 associated with the application. The application distribution service 106 may rank the one or more application files 118 based at least in part on one or more of parameters of the client device 102, history associated with the client device, popularity of individual application packages, etc. The application distribution service 106 may then select an application files 118 based in part on the ranking, or according to other means. For example, the application distribution service 106 may identify a plurality of available update files associated with the application, and may select a first available update file based upon the update history of the client device.

At operation 306, the computing device sends targeted application metadata associated with the application file to the client device. The application targeted metadata may be selected by the application distribution service 106 based upon its association with the application file identified. For example, the instance of metadata may store information containing applicability information to deploy that application file selected in operation 304. The application metadata may include any data structure or format capable of preserving and conveying such information (e.g., extensible markup language (XML), JSON file, etc.). For example, the application targeted metadata may be preserved and conveyed in a text file.

At operation 308, the computing device may receive an indication of applicability of the application file to the client device. The indication may be a result of a determination made based on a comparison between the targeted application metadata 122 and the parameters of the client device 102. In some processes, the applicability determination may be performed by a single entity on the client device 102, such as an application service or a deployment engine.

The indication of applicability may identify the applicability of the selected application file 118. For example, the application service may indicate that the selected application file 118 is already installed on the client device 102, that it is installable, or that the application file 118 is not applicable. Alternatively, the indication of applicability 124 may identify that the selected application file 118 is either applicable, or is not applicable to the client device 102. Additionally, in instances where the application targeted metadata is associated with more than one application files, the indication of applicability may identify the applicability of each of the individual associated application packages.

At operation 310, the computing device may send the application package to the client device. In some examples, the computing device sends the application file to the client device based at least in part on the indication of applicability. The application distribution service 106 may repeat operations 304-308 until one or more applicable application files are identified. For example, in instances where the indication of applicability indicates that the application file is not applicable to the client device, the application distribution service 106 may repeat operations 304-308 until an applicable application file is identified. Additionally, where more than one applicable application files are identified for the client device, the application distribution service 106 may send an application package bundle to the client device, the bundle including one or more applicable application files.

Example Process for Determining Application Package Applicability

Figure 4:
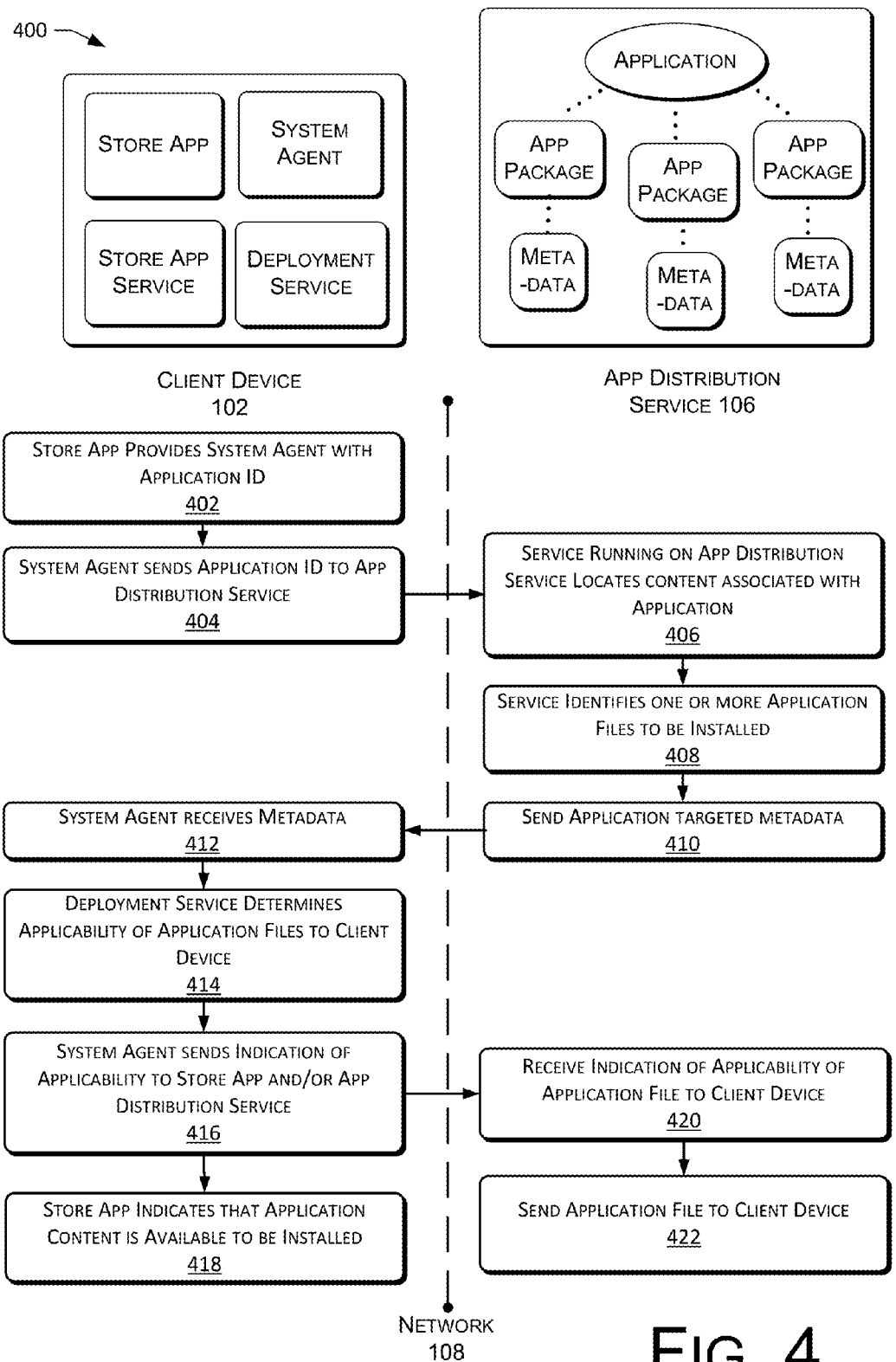
FIG. 4 is a flow diagram of an example process usable to determine the applicability of application package bundles to a particular client device.

FIG. 4 is a flow diagram of an example process 400 usable to determine the applicability of application files to a particular client device. FIG. 4 further illustrates client device 102, network 108, and application distribution service 106. While FIG. 4 may illustrate an example location where individual operations take place (i.e. performed on the client device, sent across the network, etc.), individual operations of process 400 may be performed by a client device, an application distribution service, or another website or service.

At operation 402, a store app provides the system agent with an application ID. The store app may be an application installed on the memory of the client device 102, that when executed allows the user to browse applications available via an application distribution service 106. Alternatively, the store app may be a generalized browser through which the client device 102 may interact with the application distribution service 106. The store app may provide the application ID based in part on an input received by a client 104 associated with the client device 102. For example, the client device 102 may receive one or more inputs from a client 104 to perform a search for one or more applications. In response to the inputs, the store app may then identify possible applications that satisfy one or more search parameters. The store app may then provide an application ID for an application of the possible applications to the system agent.

At operation 404, the system agent sends the application ID to the app distribution service. In some examples the system agent may be part of the operating system of the client device 102, such as an update agent. Alternatively, the system agent may be an independent application configured to communicate with the application distribution service. Additionally, the system agent may also send a notification to determine if there is content available (i.e. an application package, or application package bundle) that is associated with the application ID.

At operation 406, a service running on the application distribution service locates content associated with the application. The service may be associated with a backend of a content delivery system on the application distribution service 106. The content delivery system may store and distribute software applications for one or more platforms to client devices 102. More specifically, the content delivery system may store and distribute application files comprising coding for one or more features for the application, each application file being configured to be executed in a particular computer environment. The service running on the application distribution sever may use the application ID to locate content stored on the content delivery system that is associated with the application.

At operation 408, the service identifies one or more application files that may need to be installed. The service may identify the application files based at least in part on one or more of a ranking of application files, or according to other means.

At operation 410, the application distribution service sends application targeted metadata to the client device. The application targeted metadata may be sent by the application distribution service 106 based upon its association with the one or more application files identified in operation 408. The application targeted metadata may store information containing applicability information to deploy the application file selected in operation 404. For example, the application targeted metadata may identify a type of electronic device, localization, features, contrasts, language, hardware requirements, processor, graphics card, display requirements, operating system, etc. that one or more corresponding application files bundles are applicable to. The application metadata may include any data structure or format capable of preserving and conveying such information (e.g., XML, JSON, etc.). For example, the application targeted metadata may be preserved and conveyed in a text file.

At operation 412, the system agent receives the application targeted metadata from the application distribution service 106.

At operation 414, a deployment service determines the applicability of the application file to the client device 102. The deployment service may comprise a deployment engine. In some examples deployment service may be part of the operating system of the client device 102. Alternatively, the deployment service may be an independent application configured to deploy application files on the client device 102. The deployment service may determine the applicability of the application file to the client device based at least in part on a comparison between the targeted application metadata and the parameters of the client device. The comparison between the targeted application metadata 122 and the parameters of the client device 102. For example, the deployment service may determine that an application file is applicable based at least in part on the application targeted metadata containing data that indicates that the application file is executable on an electronic device having the same parameters as the client device.

At operation 416, the system agent sends an indication of applicability to the store app and/or the application distribution service.

At operation 418, the store app indicates that application content is available to be installed. For example, upon receiving the indication that the application is applicable to the client device, the store app may present an option to acquire the application file (e.g. a download button, message that additional content is available, etc.). Additionally, the store app may be configured to only present application search results for application content that is applicable with the client device, and/or the store app may allow the user to sort search results based on applicability. In this way, the client may be prevented from wasting bandwidth by downloading content that is not applicable to the client device.

At operation 420, the application distribution service receives the indication of applicability of the application file to the client device.

At operation 422, the application distribution service sends an application package bundle to the client device. In some instances this may include sending a link to download the application file to the client device. Once the link is received, the client device is able download the application file from the content distribution service associated with the application distribution service.

Example Process for Generating Application Targeted Metadata

Figure 5:
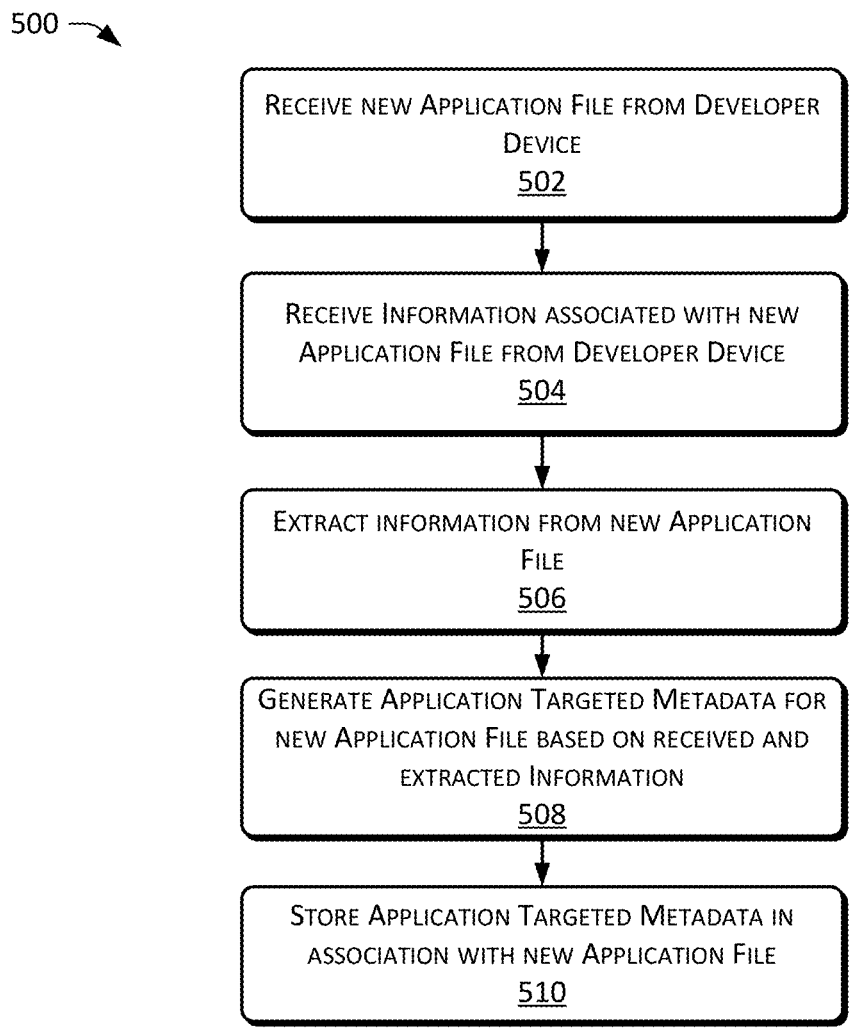
FIG. 5 illustrates an example process for generating application targeted metadata.

FIG. 5 illustrates a flow diagram of an example process 500 for generating application targeted metadata.

At operation 502, an application distribution service 106 receives a new application file from a developer device 110. The new application file may correspond to a new application for distribution, or it may correspond to an update for an existing application on the application distribution service. The developer device may be associated with the application distribution service, or it may be associated with a third party application developer. Additionally, the application distribution service 106 may receive the new application file via a portal that enables application developers to add and update application packages stored on the application distribution service 106.

At operation 504, the application distribution service 106 receives information associated with the new application file from the developer device. This information may be provided by the developer device during the uploading of the new file to the application distribution service 106. Additionally or alternatively, upon receiving the new application package, the application distribution service may prompt the developer device to provide information associated with the new file. For example, the application distribution service may prompt the developer device for information regarding policies for the new application file, such as a minimum age requirement.

At operation 506, the application distribution service 106 extracts information from the new application file. The information may be extracted based upon an analysis of the coding for the new application file. For example, by analyze the coding the application distribution service 106 may determine that the new application file is executable on a particular processing architecture.

At operation 508, the application distribution service 106 generates application targeted metadata for the new application file based on the received and extracted information. The application metadata may include any data structure or format capable of preserving and conveying such information (e.g., extensible markup language (XML), JSON file, etc.). For example, the application targeted metadata may be preserved and conveyed in a text file. In some instances the application targeted metadata may store information containing necessary applicability information for deploying the new application file.

At operation 510, the application distribution service 106 stores the application targeted metadata in association with the new application file. The application targeted metadata and the new application file may be stored in the memory of a content distribution network associated with the application distribution service 106. Once the application targeted metadata file is stored, it may still be accessed and updated. For example, the developer device may update the application targeted metadata to change a policy of the new application file.

The processes 300, 400, and 500 are described with reference to the architecture 100 and system 200 of FIGS. 1 and 2 for convenience and ease of understanding. However, the processes 300, 400, and 500 are not limited to being performed using the architecture 100 and system 200. Moreover, the architecture 100 and system 200 are not limited to performing the processes 300, 400, and 500.

The processes 300, 400, and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the processes 300, 400, and 500 may be combined in whole or in part.

The various techniques described herein may be implemented in the context of computer-executable instructions or software, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

In closing, although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
    at least one processing unit;
    a communication interface configured to be in communication with the at least one processing unit and to:
        send a notification to an application server to install an application, and
        receive, based at least in part on the notification, metadata describing an application file associated with the application; and
    memory configured to be in communication with the at least one processing unit, the memory storing instructions that in accordance with execution by the at least one processing unit, cause the at least one processing unit to:
        determine an applicability of the application file to the computing device by comparing the metadata to one or more characteristics of the computing device;
        output an indication of the applicability of the application file to the computing device for transmission by the communication interface, the indication of the applicability designating the application file as applicable or not applicable with the computing device; and
        receive, from the application server via the communication interface, an application package including the application file based at least on the indication of applicability designating the application file as applicable.

2. The computing device of claim 1, wherein the communication interface is further configured to transmit an applicability notification to the application server, the applicability notification providing the indication of the applicability of the application file.

3. The computing device of claim 2, wherein the applicability notification provides that the application file is not applicable to the computing device, wherein the application file is a first application file, and wherein the communication interface is further configured to receive, based at least in part on the first application file not being applicable, metadata describing a second application file.

4. The computing device of claim 1, wherein the application file is a first application file, the indication is a first indication, and the metadata is first metadata, and wherein the communication interface is further configured to receive, based at least in part on the first indication, second metadata describing a second application file associated with the application, the instructions further cause the at least one processing unit to:
    determine an applicability of the second application file to the computing device by comparing the second metadata to the one or more characteristics of the computing device; and
    output a second indication providing that the second application file is not applicable to the computing device for transmission by the communication interface, wherein the second application file is not received from the application server by the client device based at least in part on the second indication.

5. The computing device of claim 1, wherein the metadata identifies at least a platform requirement associated with the application file.

6. The computing device of claim 1, wherein the determination of applicability of the application file to the computing device is performed by a deployment engine executed on the client device.

7. A method for acquiring an application file, comprising:
    transmitting, by a communication interface of a computing device and to an application server, a notification to install an application,
    receiving, based at least in part on the notification, by the communication interface and from the application server, metadata describing an application file associated with the application;
    determining, by the computing device, an applicability of the application file to the computing device by comparing the metadata to one or more characteristics of the computing device; and
    transmitting, by the communication interface and to the application server, an indication of the applicability of the application file to the computing device, the indication of the applicability designating the application file as applicable or not applicable with the computing device; and
    receiving, from the application server via the communication interface, an application package including the application file based at least on the indication of applicability of designating the application file as applicable.

8. The method of claim 7, wherein the indication of the applicability of the application file provides that the application file is not applicable to the computing device, and wherein the application file is a first application file, the method further comprising receiving, by the communication interface, metadata describing a second application file associated with the application.

9. The method of claim 7, wherein the application file is a first application file, the indication is a first indication, and the metadata is first metadata, the method further comprising:
    receiving, based at least in part on the first indication, by the communication interface and from the application server, second metadata describing a second application file associated with the application;
    determining, by the computing device, an applicability of the second application file to the computing device by comparing the second metadata to the one or more characteristics of the computing device; and
    transmitting, by the communication interface and to the application server, a second indication providing that the second application file is not applicable to the computing device, wherein the second application file is not received by the client device based at least in part on the second indication.

10. The method of claim 7, wherein the metadata identifies at least a platform requirement associated with the application file.

11. The method of claim 7, wherein the applicability of the application file to the computing device is determined by a deployment engine running on the computing device.

12. A server system comprising,
    one or more processing units;
    memory configured to be in communication with one or more processing units, the memory storing instructions that in accordance with execution by the at least one processing unit, cause the one or more processing unit to:

receive, from a computing device, an indication that an application is to be at least one of installed or updated on the computing device, the indication including an application identifier associated with the application;

identify, based on the application identifier, one or more application files associated with the application;

select an application file of the one or more application files associated with the application;

identify application metadata identifying at least a platform requirement associated with the application file; and transmit the application metadata to the computing device.

13. The server system of claim 12, wherein the computing device is a first computing device, and wherein the instructions further cause the at least one processing unit to:

receive, from a second computing device, the application file associated with the application, and generate the application metadata based at least in part on first information provided by the second computing device and second information automatically extracted from the application file.

14. The server system of claim 12, wherein the instructions further cause the at least one processing unit to rank the one or more application files associated with the application, and wherein the selection of the application file is based at least in part on the ranking.

15. The server system of claim 12, wherein the application file is a first application file, and wherein the application metadata further identifies at least a platform requirement associated with a second application file associated with the application.

16. The server system of claim 12, wherein instructions further cause the one or more processing unit to:

receive, from the computing device, an applicability notification providing an indication of the applicability designating the application file as applicable or not applicable to the computing device;

determine whether the application file is applicable to the computing device; and transmit, from the server system, an application package including the application to the computing device based at least on a determination that the application file is applicable to the computing device; and forgoing transmission, from the server system, the application package including the application to the computing device based at least on a determination that the application file is not applicable to the computing device.

17. The server system of claim 16, wherein the application file is a first application file, the application metadata is first application metadata, and wherein the instructions further cause the at least one processing unit to:

select a second application file of the one or more application files associated with the application;

identify second application metadata identifying at least a platform requirement associated with the second application file;

transmit the second application metadata to the computing device;

receive, from the computing device, a second applicability notification providing an indication of the applicability designating the second application file as applicable or not applicable to the computing device;

determine whether the second application file is applicable to the computing device; and transmit, from the server system, a second application package including the application to the computing device based at least on a determination that the second application file is applicable to the computing device.

18. The server system of claim 17, wherein the second application file is not transmitted to the computing device based at least in part on the second application file not being applicable to the computing device.

\* \* \* \* \*